United States Patent [19]

Rosthauser et al.

[11] Patent Number: 4,985,490

[45] Date of Patent: Jan. 15, 1991

[54] METHOD OF DIRECT MANUFACTURE OF PIGMENTED POLYURETHANE POWDER

[75] Inventors: James W. Rosthauser, Imperial, Pa.; Walter Meckel, Neuss; Werner Rasshofer, Koeln, both of Fed. Rep. of Germany

[73] Assignees: Bayer Aktiengesellschaft, Leverkusen, Fed. Rep. of Germany; Mobay Corporation, Pittsburgh, Pa.

[21] Appl. No.: 336,978

[22] Filed: Apr. 12, 1989

[51] Int. Cl.$^5$ .................................................. C08K 3/22
[52] U.S. Cl. ................................... 524/871; 525/123; 528/48; 524/848; 524/874; 524/875
[58] Field of Search ............... 524/850, 848, 871, 874, 524/875; 525/123; 528/76, 83, 902, 48, 61

[56] References Cited

U.S. PATENT DOCUMENTS 3,591,568  7/1971  Farber ................................. 260/87.1
3,917,741  11/1975  McGrary ................................. 528/48
4,230,812  10/1980  Tork et al. ........................... 524/110

FOREIGN PATENT DOCUMENTS 1052241  12/1966  United Kingdom .

Primary Examiner—Veronica P. Hoke
Assistant Examiner—Kathryne Sheborne
Attorney, Agent, or Firm—Joseph C. Gil; Thomas W. Roy

[57] ABSTRACT

The present invention is directed to a process for the direct production of a pigmented thermoplastic polyurethane powder in finely divided form by
(a) reacting with agitation at an overall equivalent ratio of isocyanate groups to isocyanate reactive groups of about 0.5 to 1.1
(i) a surfactant-stabilized emulsion of fine droplets of a first reactant which has an average of about two isocyanate or isocyanate reactive groups in admixture with at least one pigment with
(ii) a second reactant which contain an average of about two isocyanate or isocyanate reactive groups,
in an inert organic liquid in which the first reactant, the pigment and the powder are substantially insoluble or immiscible to form particles of the powder which are protected from agglomeration by the surfactant, and
(b) separating the particles of the powder from the inert organic liquid.

The present invention is also directed to the pigmented thermoplastic polyurethane powders obtained by this process.

26 Claims, No Drawings

METHOD OF DIRECT MANUFACTURE OF PIGMENTED POLYURETHANE POWDER

BACKGROUND OF THE INVENTION

1. Field of the Invention

The present invention is directed to the direct manufacture of pigmented polyurethane powders and to the powders obtained therefrom.

2. Description of the Prior Art

The demand for thermoplastic resin powders is increasing for such uses as coatings, adhesives, thin films, and foils. The number of applications where these thermoplastic resin powders must be pigmented is also rapidly increasing as many manufacturers replace products and processes which discharge solvent materials into the atmosphere with products containing no solvents.

In general, resin powders have been prepared by grinding already formed resinous materials or by dissolving already formed resin and precipitating it from solution. It has also been shown that solid resinous materials can be produced by coagulation of resin lattices. Also, it is known that polyurethanes can be prepared by the interfacial polymerization of polyisocyanates with compounds containing amine or hydroxyl groups when the reaction is carried out in the presence of an inert liquid medium where at least one of the reactants is insoluble in the medium. The use of special surfactants also allows one to make very fine particles of a uniform size which may be below 100 microns.

The simple addition of dry pigments to these thermoplastic resin powders can cause problems with the practical applications of the pigmented resin powders. Due to the differences in particle size of the resin powder and the pigment particles as well as the differences in densities of the two materials, settling of the pigment can occur during transport and storage of the pigment/resin mixture. This will result in inconsistencies in color tone and intensity of the resulting pigmented polymer when it is used. Often pigmented films formed from resins prepared in this manner have very poor surface appearance. Bubbles often occur in the surface due to the release of a large amount of gases which are normally present on the pigment surfaces. Also, agglomerated pigment particles can cause a rough surface especially when thin films of the pigmented materials are made.

Normally, pigmented thermoplastic resin powders are produced by melting these resinous powders, or thermoplastic resins prepared by other conventional methods, and then blending them with the pigment(s) and finally grinding the pigmented resins into finely divided solids. Because the resinous materials to be ground are thermoplastic and often tough materials, relatively costly and technically impractical procedures involving chilling the resin, for example with liquid nitrogen, have been necessary for effective grinding of the pigmented thermoplastic resins. In addition to the cost of the refrigerant and the grinding equipment, sophisticated collection equipment has been necessary because of the substantial amount of dust which is generated in the grinding process. Also it is difficult to assure that moisture which is condensed onto the product during and after the cooling process is excluded from the finished pigmented thermoplastic powder. Finally, the irregular shapes of these powders can also cause poor flowability which hinders the transfer, handling and application characteristics of these materials.

It is an object of the present invention to manufacture a homogeneous pigmented resin powder directly, i.e., without grinding an already formed thermoplastic pigmented resin into a powdered form.

SUMMARY OF THE INVENTION

The present invention is directed to a process for the direct production of a pigmented thermoplastic polyurethane powder in finely divided form by
  (a) reacting with agitation at an overall equivalent ratio of isocyanate groups to isocyanate reactive groups of about 0.5 to 1.1
    (i) a surfactant-stabilized emulsion of fine droplets of a first reactant which has an average of about two isocyanate or isocyanate reactive groups in admixture with at least one pigment with
    (ii) a second reactant which contain an average of about two isocyanate or isocyanate reactive groups,
  in an inert organic liquid in which the first reactant, the pigment and the powder are substantially insoluble or immiscible to form particles of the powder which are protected from agglomeration by the surfactant, and
  (b) separating the particles of the powder from the inert organic liquid.

The present invention is also directed to the pigmented thermoplastic polyurethane powders obtained by this process.

DETAILED DESCRIPTION OF THE INVENTION

In the context of the present invention, the term "polyurethane" encompasses not only pure polyurethanes, but also polyurethane-ureas which contain a sufficiently low amount of urea groups to maintain thermoplasticity of the polymer. Pigmented polyurethanes are made directly in a very finely divided form by reaction between a first reactant containing the pigment(s) and the other reactant(s) in an organic liquid medium which is inert to the reactants and pigment(s). At least one of the reactants is insoluble in the organic liquid medium and is admixed with the pigment(s) and then is emulsified as fine droplets in a continuous phase of the the liquid medium with the aid of special surfactants. Reaction between the reactants takes place at the surfaces of the droplets which constitute an interface between the reactants. The pigmented product from the chemical combination and polymerization of the reactants remains in dispersed form as solid particles insoluble in the organic liquid vehicle and may be separated as powder. Surprisingly, it was found that to a great extent the pigment(s) remain in the interior of the thermoplastic polyurethane particles and only a small portion if any of the pigment(s) remains in the organic liquid phase when the powder is separated from the vehicle.

Organic liquids for use as the continuous phase of the emulsion may be any liquid in which at least one of the reactants and the reaction product are immiscible and insoluble and which is not reactive with the pigment(s) or reactants, i.e., inert to the pigment(s) normally used in coatings, inks, films, and foils and not reactive with isocyanate or active hydrogen-containing compounds normally used in the preparation of thermoplastic polyurethanes including, but not limited to, hydroxyl- and aminofunctional materials. It is desired that such liquids be volatile for removal from the reaction product by evaporation at temperatures which will not harm the product and that the boiling point be above the desired reaction temperature. Liquids with lower boiling points may be used but may require the use of pressure vessels to allow operation at the desired temperature. Liquids which are high boiling or otherwise difficult to remove from the reaction product may be removed by subsequent washing or by solvent extraction with liquids which do not harm the reaction product and which are more readily removed. Organic liquids having a boiling point or boiling range preferably between about 40° C. and 200° C. such as hydrocarbons, halogenated hydrocarbons and ethers may be used. Hydrocarbon liquids, preferably aliphatic hydrocarbon liquids such as petroleum fractions with boiling ranges between about 65° C. and 150° C., have been found desirable because of their low cost, inertness to the reactants and pigment(s) and ease of removal from the reaction product.

Desirably, the organic liquid is used in the minimal amount necessary to maintain it as the continuous phase of the reaction system because it is a medium for manufacture and not part of the final product. On a parts by weight basis, 25 to 99%, preferably 40 to 90% and most preferably 60 to 80% of the reaction system is comprised of the inert organic liquid.

In order to form fine droplets of the mixtures of pigment(s) and insoluble reactant in the organic liquid phase, the degree of agitation of the reaction mixture must be sufficiently high. Because the densities of the mixtures of pigment(s) and reactants are relatively high in comparison to those of the liquid organic phase, first and foremost, gravitational forces must be overcome. Also, the diameter of the droplets is dependent upon the degree of agitation; the higher the degree of agitation, the smaller the average diameter of the droplets. Any of the well-known agitation or emulsification equipment can be used to disperse the mixtures of pigment(s) and insoluble reactants. Thus normal mixing devices such as stirring shafts equipped with the various types of agitator blades, as well as, high speed agitating devices and homogenizers have been found to be effective. Also devices which force the mixtures of pigment(s) and insoluble reactants through narrow openings to form the emulsions are applicable. Examples of these devices are disclosed in British Patent Nos. 1,414,930; 1,432,112; and 1,428,907.

Forming a uniform emulsion of the insoluble reactant containing the pigment(s) as fine droplets with sufficient stability imposes special requirements not only on the intensity of agitation necessary during the dispersion process but also on the surfactant. In addition to chemical inertness with respect to the reactants, the surfactant must possess exacting polarity requirements. In addition to impeding the deposition of the reaction materials on the agitator blades and vessel walls, the surfactant must also meet the conflicting requirements of allowing the pigmented solidified polyurethane settle out as fine particles and yet keeping the particles from agglomerating after settling.

Use of a surfactant effective to aid in forming and maintaining an emulsion of fine droplets of the mixtures of pigment(s) and the insoluble reactant is of primary importance in the operation of the method to form pigmented thermoplastic powders. It has been recognized that the suitability of emulsifying agents can be determined at least partly on the basis of their so-called hydrophile-lipophile balance numbers (HLB). The necessity of balance in nonaqueous systems is illustrated by the fact that stable dispersions of organic solids in organic liquids can be made using copolymers as surface active stabilizers (British Patent No. 1,052,241 issued to Osmond, published Dec. 21, 1966). In such cases, one part of the copolymer is solvated by the organic liquid and the other part becomes associated with the dispersed solid. The patent teaches that for use in the patented process, the copolymer must have a substantial molecular weight (at least 7000) to be effective.

U.S. Pat. No. 3,917,741 issued to McGarr, published Nov. 4, 1975, teaches that thermoplastic polyurethane powders can be produced by utilizing special surfactants which are copolymers containing polar and nonpolar monomers. The disadvantage of this patent is that these polyurethane powders must be subsequently pigmented to provide the types of materials described in the present invention; however, the types of surfactants described in this patent have been found useful in preparing the pigmented thermoplastic polyurethane solids described herein.

The surfactants employed in the process described herein are preferably non-ionic surfactants of the type illustrated by the olefin/vinylpyrrolid(in)one copolymers known commercially as "Ganex" or "Antaron" V polymers (sold by General Aniline and Film Co.) These are designated by three numbers, the first number indicating the weight percent of N-vinylpyrrolid(in)one (NVP) in the copolymer, and the last two numbers indicating the chain length of the olefin; the latter being 3-20 carbons. For example "Ganex", or "Antaron" V-516 surfactant is a copolymer containing 50% by weight of NVP and 50% hexadecene-1, while V-220 is a copolymer containing 20% NVP and 80% eicosene-1. These surfactants are described somewhat more in detail in U.S. Pat. No. 3,591,568 issued to Farber, herein incorporated by reference, where they are said to be useful in a suspension polymerization process for the manufacture of vinyl chloride/vinyl acetate copolymers. In the present invention "Antaron" or "Ganex" V-220 surfactant has been found to be most useful.

The amount of surfactant necessary to form and maintain a stable emulsion of droplets is dependent upon a number of factors including the concentration of the pigmented thermoplastic solid in the continuous phase of the organic liquid; the chemical composition of the mixtures of pigment(s), reactants and catalysts which determine the characteristics of the reaction systems; and the degree of agitation during the emulsion and reaction steps. A higher concentration of the solid in the reaction system requires that more surfactant be present to provide a stable suspension. A higher concentration of pigment(s) in the reactive mixture requires a greater amount of surfactant to be present. A higher degree of agitation can compensate for somewhat lesser amounts of surfactant and can also result in a finer particle size when the amount of surfactant is kept constant. The diameter of the droplets of emulsified particles and thus the resulting pigmented thermoplastic powder can also be regulated by the amount of surfactant used to provide emulsification; the more surfactant used, the smaller the diameter of the droplets and of the resulting powder. In general, from about 0.01 to about 20%, preferably about 0.5 to 10% and most preferably about 2 to 5% of the surfactant, based on the weight of the emulsified mixture of pigment(s) and insoluble reactants is used. It has been found that a considerable amount of the surfactant remains in the inert organic liquid after the pigmented thermoplastic solid is separated from the liquid and it can be recycled and used again to form subsequent emulsions.

The word "pigment(s)" as used herein is meant to encompass unreactive, insoluble, solid materials which alter the optical properties of the resin or render them no longer transparent. Thus, this term encompasses not only a pigment or mixtures of more than one pigment, but also other materials such as fillers and extenders commonly used in many industrial applications. The pigment(s) are used in amounts of up to about 50%, preferably about 0.5 to 40% and most preferably about 2 to 20%, based on the total weight of the pigmented thermoplastic powders described herein.

Pigments used in the herein described process are both organic and inorganic and are largely the same as those used in the manufacture of liquid coatings and inks as well as those used in the manufacture of non-transparent plastic films and foils. The exception would be that the pigments are not reactive with the reactants used to form the solid polyurethane or with the organic liquid or surfactants used in the herein described process. Due to their better stability in the presence of heat and light and their better resistance to weathering, inorganic pigments are more preferred than organic pigments.

These inorganic pigments are well known to those skilled in the art and include, but are not limited to, the following: aluminum powders and pastes; antimony oxide; basic carbonate white lead; basic silicate; basic silicate white lead; bronze powders; cadmium reds, oranges, and yellows; calcium chromate; calcium metasilicate; chrome cobalt; chrome yellows, greens, and oranges; chrome titanium; chromium oxide; chromium phosphate; cobalt blues, greens, and violets; copper oxide; copper powders; dibasic lead phosphite; gold bronze powders and pastes; hydrated chromium oxide; the various forms and colors of iron oxides; lead antimonate; lead pastes and powders; manganese violets and blues; mercuric oxides; mercuric-cadmium reds and oranges; the various types of metallic and metal-flake pigments; the various forms of mica; molybdate and molybdate chrome oranges; nickel greens; nickel azo; nickel titanate; pearl and pearlescent-type pigments; strontium chromate; the various forms of titanium dioxide; tungstinated blues and violets; zinc borate; zinc dust; zinc oxide; zinc chromate; and zinc sulfide. Carbon black, furnace blacks, and lamp-black pigments can also be used. The various forms and colors of iron oxide, the various forms of titanium dioxide, and the various carbon blacks, furnace blacks, and lamp-blacks are preferred in accordance with the present invention.

Organic pigments which can be used in the process described herein are preferably solids and are in many cases obtained by salt formation with various organic compounds. These pigments are well known to those skilled in the art and include, but are not limited to, the following: acridone red, acylamino yellow, alizarine reds and maroons, alkali blues, aniline pigments, anthraquinones, anthanthrone scarlet, anthropyrimidine yellow, arylide maroon, azo yellows, benzidene oranges and yellows, carbazole violet, dianisidine blues and oranges, diarylide pigments, dibenyanthrone violet, dinitraniline orange, dioxazines, dioxazone carbozole violet, flavathrone, indanthrene blues, indigo, iron blue or ferric ferrocyanide, isoindolinone, napthol reds and yellows, oxazole red, perylene red, phthalocyanines, pyranthones, pyrazolones, quinacridone reds and violets, thioindigo, and toluidine reds and maroons.

The pigments are also often used in combination with extenders or fillers. These materials are also well known to those skilled in the art and include: aluminum silicate, barium sulfate or blanc fixe or barytes, bentonite, calcined and other clays, calcium carbonate, calcium metasilicate, calcium silicate, calcium sulfate, diatomaceous silica, hydrated alumina, hydrous calcium silicate, magnesium silicate or talc, mica, pyrophlite, silica, fumed silica, amorphous silica, diatomaceous silica, quartz silica, sodium aluminosilicate, and synthetic calcium silicate. These extenders or fillers can be used in amounts of up to about 80% of the total pigment(s) used in accordance with the present invention.

The pigment(s) are added to at least one of the reactants which is insoluble or immiscible in the organic liquid and is used to form the thermoplastic solid. When they are added to only one of the reactive components, in cases where more than one reactant is insoluble or immiscible in the organic liquid, they are preferably added to the reactant which comprises the higher percent by weight of the reactants which form the solid thermoplastic resin; however, they can be added to any or all of the reactants which are insoluble or immiscible therein.

A limiting feature of the present invention is that pigment(s) must be added to the insoluble reactant(s) prior to emulsifying them in the organic liquid. However, the pigment(s) can be added at any earlier stage of the process before the material is polymerized to a sufficient molecular weight which would render the material solid above the boiling point of the organic liquid at the pressure used in the processing step. The pigments are preferably added to the insoluble reactant(s) at a point where the reactants have sufficiently a low viscosity to facilitate easy and thorough mixing and to completely "wet" the surface of the particles of the pigment(s). The pigment(s) are also preferably added at a point in which adsorbed water and gases which are usually present on the surfaces of the particles of the pigment(s) can be removed.

To this end, the pigment(s) are preferably added to the polyol reactant(s) used for the preparation of the solid thermoplastic polyurethanes described herein. The pigment(s) can be simply stirred into or otherwise mixed into the polyol(s) or they can preferably be "ground" into the polyols by use of extruders, high speed mixers, or so-called mills, which are known to those skilled in the art. Roll mills, sand mills, ball mills, and pebble mills are a few of the types of devices which can be used. We have found that a mill with a stationary corundum disc and a rotor is quite suitable in the present invention. The displacement and removal or adsorbed water and gases on the surfaces of the pigment particles is facilitated not only during the "wetting" of the particles, but also through the "dewatering" of the polyol, which is common practice in the preparation of urethane resins. Thus, in a preferred embodiment of the present invention, the polyol/pigment(s) mixture is heated under vacuum prior to use in order to remove moisture and gases from both in a single operation.

The pigmented thermoplastic powders can be prepared by methods for polyurethane preparation known to those skilled in the art. Either the "one-shot" or the "prepolymer" preparation method may be used.

In the context of the present invention, the "one-shot" method involves the preparation of the pigmented solid polyurethanes by adding the polyol(s), one or more of which contains the pigment(s), the isocyanates, and the (amine or hydroxyl) chain extenders, which may also contain pigment(s), to the organic liquid phase containing the surfactant to form the polyurethane. The reaction mixture may be formed by introducing the reactants into the organic liquid medium separately at the same time under conditions which emulsify the insoluble reactant(s) containing pigment(s) and dissolve the soluble reactant(s) in the liquid medium; or by separately emulsifying the insoluble reactant(s) containing the pigment(s) in a portion of the organic liquid medium and adding the emulsion(s) to a body of organic liquid medium containing the soluble reactant(s); or by emulsifying the insoluble reactant(s) containing the pigment(s) directly into the organic liquid medium already containing the soluble reactant(s); or by emulsifying the insoluble reactant(s) containing pigment(s) into the organic liquid medium and then adding the soluble reactant(s) to the emulsion. In cases where amine chain extenders or reactant(s) are used, the amines are preferably added last, regardless of whether they are soluble or insoluble in the organic medium.

In the context of the present invention, the "prepolymer" method initially involves the preparation of a "prepolymer" or reactive oligomer containing isocyanate or isocyanate reactive groups, subsequently adding the oligomer to the organic liquid medium containing the surfactant, and thereafter completing the formation of the pigmented thermoplastic polyurethane. The oligomers can be terminated with isocyanate or with isocyanate-reactive groups. In cases where these oligomer(s) are insoluble in the organic liquid, the pigment can be contained in the oligomer(s) prior to emulsifying them into the organic liquid. The pigment can also be contained in the polyol or isocyanate prior to the formation of the "prepolymer". In cases where these oligomer(s) are highly or completely soluble or miscible in the organic liquid, the pigment must be contained in another of the reactant(s). The different possibilities for the addition of the oligomers are the same as those in the "one-shot" method with the oligomer being considered as one of the reactants.

The method of the present invention has been found particularly useful in the manufacture of pigmented polyurethane powders by reacting at least one organic compound having at least two groups active hydrogen atoms which are reactive with isocyanate groups and at least one organic compound having at least two isocyanate groups. It is possible however to substitute a portion of the reactants with organic compounds containing only one of either of these groups and using them in combination with compounds having more than two groups. In the preparation of pigmented thermoplastic polyurethane powders of the present invention any of the reactants known from polyurethane chemistry may be used; reactants containing either two isocyanate or two isocyanate-reactive groups are preferred. These components are set forth hereinafter.

Examples of suitable polyisocyanates to be used in preparing the pigmented thermoplastic powders are the diisocyanates represented by the formula

R(NCO)2 wherein R is the organic group obtained by the removal of the isocyanate groups from an organic diisocyanate having a molecular weight of about 112 to 4000, preferably about 140 to 400. Preferred diisocyanates for the process according to the invention are those represented by the above formula wherein R represents a divalent hydrocarbon group having 4 to 18 carbon atoms, a divalent cycloaliphatic hydrocarbon group having 5 to 15 carbon atoms, a divalent araliphatic hydrocarbon having 7 to 15 carbon atoms or a divalent aromatic hydrocarbon group having 6 to 15 carbon atoms. Examples of organic diisocyanates which are particularly suitable for the process include, but are not limited to, tetramethylene diisocyanate; 1,6-hexamethylene diisocyanate; dodecamethylene diisocyanate; cyclohexane-1,3- and 1,4-diisocyanate; 1-isocyanato-3-isocyanatomethyl-3,5,5-trimethylcyclohexane (isophorone diisocyanate or IPDI); bis-(4-isocyanatocyclohexyl) methane; 2- and 4-isocyanatocyclohexyl-2'-isocyanatocyclohexyl methane; 1,3- and 1,4-bis-(isocyanatomethyl)-cyclohexane; bis-(4-isocyanato-3-methylcyclohexyl) methane; 1,3- and 1,4-tetramethylxylylidene diisocyanate; 2,4- and/or 2,6-diisocyanatotoluene; 2,2'-, 2,4'- and/or 4,4'-diisocyanatodiphenyl methane; 1,5-napthalene diisocyanate; p- and m-phenylene diisocyanate; dimeryl diisocyanate; xylylene diisocyanate; and diphenyl-4,4'-diisocyanate. These diisocyanates are soluble or miscible with many of the organic liquids used in accordance with the present invention.

Other polyisocyanates may be used, which depending on their structures may also be soluble in the organic liquids, although for the formation of the pigmented thermoplastic polyurethanes of the present invention, they are less preferred. Included among these are the lower molecular weight adducts of the above-mentioned diisocyanates which are well known to those skilled in the art as being useful crosslinkers in polyurethane coatings and adhesives. Examples of these crosslinkers include, but are not limited to the biurets, trimers, isocyanurates and trimethylolpropane adducts of these diisocyanates, as well as the polymeric residue obtained in the manufacture of the diphenylmethane diisocyanates. Also the di- and polyisocyanates described in German Patent DOS No. 36 28 316 assigned to Sanders on Feb. 25, 1988 may be used, but they are insoluble or immiscible in many of the organic liquids and thus must be emulsified with the aid of the surfactants. The isocyanates described in this patent having average molecular weights of about 400 to 4000 should be considered "prepolymers" in the context of the present invention. When polyisocyanates with more than two isocyanate groups per molecule are used, it is preferred to use them in combination with monomeric isocyanates or with isocyanate reactive compounds which contain only one reactive group per molecule in order to prevent gel formation in the pigmented thermoplastic powders.

Examples of suitable organic compounds containing active hydrogens for the preparation of the thermoplastic polyurethanes or the polyurethane prepolymers can be divided into two groups, i.e., high molecular weight compounds with molecular weights of 400 to about 6000, preferably about 800 to 3000, and low molecular weight compounds with molecular weights below 400. It is preferred that the reactants have two groups which are isocyanate reactive. It is possible to use compounds of higher functionality in limited amounts, but it is then often necessary to include a portion of a monofunctional reactant to assure that the pigmented polyurethanes which are prepared herein retain their thermoplastic character. Examples of the high molecular weight compounds are hydroxyl terminated polyesters, polycarbonates, polyestercarbonates, polyethers, polyethercarbonates, polyacetals, polyacrylates, polybutadienes, polyesteramides and polythioethers. Amino-functional polyethers such as those described in U.S. Pat. No. 4,724,252 assigned to Rasshofer on Feb. 9, 1988, herein incorporated by reference, as well as commercially available polyamines sold with the "Jeffamine" trademark may also be used. The polyesters, polycarbonates and polyethers are preferred.

Suitable polyester polyols include reaction products of dihydric alcohols and dibasic carboxylic acids. Instead of free dicarboxcylic acids, the corresponding anhydrides or diesters of lower alcohols or mixtures thereof may be used for preparing the polyesters. The carboxylic acids may be aliphatic, cycloaliphatic, aromatic and/or heterocyclic and they may be unsaturated or substituted, for example, by halogen atoms. Examples of these carboxylic acids include, but are limited to, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as oleic acid, dimethyl terephthalate and mixed terephthalates. Suitable dihydric alcohols include, but are not limited to, ethylene glycol; 1,3- and 1,2-propylene glycol; 1,4- and 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones such as e-caprolactone or hydroxycarboxylic acids such as e-hydroxycaproic acid, may also be used. Polycarbonates containing hydroxy groups include the products obtained from the reaction of diols such as 1,3-propanediol, 1,4-butanediol, 1,6-hexanediol, diethylene glycol, polyethylene glycol, polypropylene glycol and/or polytetramethylene glycol with phosgene, diaryl carbonates such as diphenylcarbonate or cyclic carbonates such as propylenecarbonate.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Suitable starting compounds containing reactive hydrogen atoms include water, Bisphenol A and the dihydric alcohols set forth for preparing the polyester polyols.

The compositions may also contain low molecular weight isocyanate reactive compounds having molecular weights of up to 400. The low molecular weight compounds which may optionally be used in combination with the high molecular weight compounds for the preparation of the pigmented thermoplastic powders include the dihydric alcohols which have been described for the preparation of the polyester polyols; aminoalcohols such as N-methyl diethanolamine and aminoethanol; diamines such as diaminoethane; 1,6-diaminohexane; piperazine; N,N'-bis(2-aminoethyl) piperazine; 1-amino-3-aminomethyl-3,5,5-trimethylcyclohexane (isophorone diamine or IPDA); bis-(4-aminocyclohexyl) methane; bis-(4-amino-3-methylcyclohexyl) methane; 1,3- and 1,4-diaminocyclohexane; and 1,3-diaminopropane. Amino-functional polyethers such as those described in U.S. Pat. No. 4,724,252 as well as commercially available polyamines sold under the "Jeffamine" trademark may also be used. Hydrazine, amino acid hydrazides, hydrazides of semi-carbazidocarboxylic acids, bis(hydrazides) and bis(semicarbazides) and the like may also be used. The low molecular weight dihydric alcohols are the preferred low molecular weight isocyanate-reactive compounds for preparing the pigmented thermoplastic powders. These low molecular weight compounds containing reactive hydrogen atoms are also preferred as chain extenders for the prepolymers in the formation of the thermoplastic polyurethanes described herein; the low molecular weight dihydric alcohols are most preferred.

In order to prepare the pigmented thermoplastic powders of the present invention, the ratio of isocyanate groups to the total number of isocyanate-reactive groups should be about 0.5 to 1.1, preferably about 0.75 to 1.08 and most preferably about 0.9 to 1.05.

It is often necessary to utilize catalysts in the preparation of the thermoplastic polyurethanes in the inert organic liquid medium. Suitable catalysts include those known in polyurethane chemistry, for example, tertiary amines such as triethylenediamine; mercury, bismuth and lead catalysts; and especially tin catalysts such as stannous octoate and dibutyltin dilaurate. The catalysts are used in amounts of about 0.001 to 3.0% by weight, based on the total weight of the thermoplastic polyurethane. The catalyst can be added to the organic liquid or the reactant(s) at any point in the process prior to obtaining the ultimate molecular weight of the thermoplastic polyurethane.

The use of leveling agents or additives with surface active properties is beneficial not only in the formation of the herein described materials, but also in their applications. These compounds can ease the "wetting" of the surfaces of the pigment(s) by the insoluble reactants. They can also aid in the formation of regular or smooth surfaces during the application of the pigmented thermoplastic powders onto substrates, or onto tools used in their processing into films or foils. Suitable additives are well known in the coatings industry and include, but are not limited to, phosphate acid esters; waxes; fluorine containing compounds; polymers or copolymers containing fluorine atoms; polymeric or higher molecular weight compounds containing silicon atoms; modified bentonites or clays; and salts of fatty acid compounds or saturated fatty acid compounds such as the various stearic acid salts. These materials are used in amounts up to about 5% by weight, based on the weight of the pigmented thermoplastic powder. They are typically added to the reactant which contains the pigment(s), but they can be added to any or all of the coreactants or to the organic liquid.

The addition of other additives is also possible depending on the end use. Plasticizers, flatting agents, antifoam agents, stabilizers, etc., may also be incorporated into the pigmented thermoplastic powders.

The time required for the reaction to form the pigmented polyurethane powders varies with the reactivity of the components of the formed droplets, the efficiency of the catalysts and the temperature of the reaction mixtures. Reaction times can be as little as about 5 seconds for amine-isocyanate reactions to as much as several hours for reactions of hindered alcohols with aliphatic isocyanates.

Carrying out the reactions by dispersing the reactive components in an inert solvent offers a number of advantages. Good temperature control is achieved since the reaction takes place in a well-agitated liquid which also functions as a heat sink for the often exothermic reactions. The relative proportion of the reactants are more uniform because localized excessive concentrations of the reactive components are avoided. This generally results in higher molecular weight products than equivalent products produced by other methods.

The pigmented thermoplastic powders are obtained in spherical form which allows them to be easily separated from the organic liquid phase. The spheres have average diameters of about 1 to 1000 microns, preferably about 10 to 350 microns. Typically, a dispersion of the completely reacted pigmented polyurethane powder is passed through a filtration device and the collected solid is washed with a fresh portion of the inert organic liquid to remove excess surfactant and unreacted portions of the soluble reactant(s) which may have been used. In cases where a higher boiling liquid is used as the inert organic liquid for the reaction, it is often necessary to wash the powders with another more volatile, inert organic liquid in which the solid is insoluble to ease in the drying of the collected solid material. The filtrate and liquid used for washing can contain a large percent of the surfactant, and thus can beneficially be reused or recycled for further use.

Drying of the collected solid particles can be accomplished by known methods such as on trays or drying screens. Procedures comparable to fluid bed drying, in which a slurry of the fine particles of the solids is suspended in contact with air or a gas which has been heated to a temperature lower than the melting or sintering temperature of the polyurethane, are preferable. In a drying operation comparable to fluid bed drying, a dusting material to prevent agglomeration of the particles may be included in the gaseous medium for drying the finely divided product.

The pigmented thermoplastic powders have melting or softening ranges of about 20° to 300° C., preferably about 50 to 250° C. and most preferably about 80° to 220° C. The materials should have sufficiently high softening points to avoid the agglomeration or sintering of the particles during transport and storage, yet sufficiently low melting points to ease their application onto the various substrates. These two contradicting points are dictated by the polyurethane structure and a good compromise can be obtained by judicial selection of the starting components. The use of plasticizers to ease in processing or to provide added flexibility to the films or foils formed from the powders may also be necessary depending on the end use of the final product.

The end products of the process can be used alone or in admixture with other polymers or copolymers depending upon the required property spectrum and the intended application for the final product. The other polymers can be solid or liquid materials. Examples of other polymers include polyethylene, polypropylene, polyvinyl acetate, ethylene/vinyl acetate copolymers, phenolic and urea/formaldehyde resins, polyvinyl chloride and copolymers containing vinyl chloride, polystyrene, styrene/butadiene copolymers, polybutadiene, graft polymers containing styrene, acrylonitrile, ethylene and other vinyl monomers, and polyacrylates.

The end products of the process are suitable for a number of application areas. They can be dissolved in suitable coatings solvents and applied by conventional methods known in the coatings industry. They can also be admixed with nonsolvents such as water and applied as a slurry. They can be used as coatings containing magnetic pigment particles for the manufacture of audio and video cassettes or for computer discs. They can be used as elastomeric coatings applied using powder coating techniques, for example, by dip coating parts which have been preheated to above the melting or softening point of the pigmented thermoplastic powders, by flow coating, by the various methods of electrostatic spray, by heat fusing the particles to form coatings on the surfaces of flexible substrates or by powder release coating methods. They are suitable for coating metals, ceramics, stone, concrete, bitumen hard fibers, glass, porcelain, a variety of plastics, and glass fibers.

They can be used as such as toners for photocopying devices or in solution or slurries as printing inks.

They can be used as binders for glass fibers, glass mats, fiber mats, cork powder or sawdust, asbestos, woven or nonwoven textile mats or split leather. This is accomplished by mixing the solid with the material to be bound and pressing at elevated temperatures. Moldings and gasket materials can also be similarly produced from the same mixtures or with the pigmented thermoplastic materials alone.

The powders can also be applied to a substrate and subsequently removed as a foil or film. They can be applied to smooth, porous or nonporous materials which may also have a design etched into the surface such as metals, glass, paper, cardboard, ceramic materials, sheet steel, silicon rubber or aluminum foil. The sheet structure can be lifted off and used as such or can be applied to a substrate using the reversal process by bonding, flame lamination or calendaring.

The powders can also be used in an in-the-mold coating process in which they are first applied to a mold and subsequently another plastic material is introduced into the mold and the finished product is then removed with a layer of the pigmented thermoplastic material already formed on the surface of the second plastic material.

The powders can be used as hot melt adhesives or as film laminating adhesives. Solutions or slurries of the powders in suitable solvents can also be used in other adhesive applications.

The invention is further illustrated, but not intended to be limited by the following examples in which all parts and percentages are by weight unless otherwise specified. The following abbreviations are used in the examples:

Polyester I - a polyester based on 1,6-hexanediol and adipic acid having an OH number of 49.
Antaron - Antaron V-220 (a commercially available surfactant supplied by GAF, copolymer of 20% by weight of N-vinyl pyrrolid(in)one and 80% eicosene-1).
Stabaxol - Stabaxol 1 (a commercially available carbodiimide stabilizer supplied by Bayer A.G.)
BHT - a commercially available stabilizer, butylated hydroxy toluene.
"Leichtbenzin" - a petroleum fraction having a boiling range of 68° C. to 98° C.
mill - a heated (90° C.) mill with a stationary corundum disc and a rotor (commercially available from Fryma Maschinen AG, in Rheinfelden, West Germany as Labortory-Small-Production Mill type MK-95/R).

EXAMPLE 1

As a comparison example, a polyurethane powder was prepared according to the procedure described in U.S. Pat. No. 3,917,741 issued to McGarr, Nov. 4, 1975. The obtained powder was pigmented (10% pigment) by simply adding and mixing dry pigments into the reaction product obtained.

A solution of 11.00 parts of Antaron surfactant, 0.94 parts of Stabaxol stabilizer, 2.35 parts of BHT, and 0.75 parts of dibutyltin dilaurate in 704 parts of "Leichtbenzin" was heated to 68° C. The solution was stirred with 2 propeller-type stirring blades mounted on a stirring shaft at a speed of 1100 rpm for 1 hour at 68° C. to assure proper mixing. Over a 15 minute period, 393.3 parts of molten (70° C.) Polyester I were added to the stirred organic solution to form a milky white dispersion of particles. The dispersion was stirred at 68° C. for an additional 1 hour, and then 58.7 parts of hexamethylene diisocyanate were added over a 16 minute period. The dispersion was stirred for an additional 1 hour, and then 15.7 parts of 1,4-butanediol were added over an 8 minute period. The dispersion was stirred at 1100 rpm for an additional 1 hours at 68° C. until no further isocyanate could be detected. The dispersion was further stirred as it was allowed to cool to 25° C. The dispersion of the powder was filtered through a Buchner funnel and the solid was washed twice with 500 ml portions of fresh "Leichtbenzin." The solid was again filtered, placed in a shallow dish and allowed to dry for three days under vacuum at room temperature. The free flowing powder was sieved through screens of various mesh sizes and had the physical properties listed in Table 1.

A film of the material was prepared on a smooth glass plate by using a doctor blade to draw down a 1000 micron thick portion of the powder, and then allowing the powder particles to fuse together for 30 minutes at 190° C. The film had no surface defects and was removed from the glass and had the physical properties listed in Table 2.

A film was prepared as described above using a mixture of 90 parts of the polyurethane powder, 1.67 parts of Bayferrox[3] 318M (a black iron oxide pigment, commercially available from Bayer, A.G.) and 8.33 parts of Bayertitan[4] R-KB-2 (a titanium dioxide pigment, commercially available from Bayer, A.G.). The film had a very poor surface appearance including large voids and small pinholes which were probably a result of the liberation of water and entrapped gases during the baking step. The physical properties of the film could not be determined.

EXAMPLE 2

A grey pigmented (10% pigment) thermoplastic polyurethane powder was prepared with the same composition as in Example 1 using the "prepolymer" procedure in accordance with the present invention.

A mixture of 9.73 parts of Bayferrox 318M pigment, 48.67 parts of Bayertitan R-KB-2 pigment and 58.40 parts of Polyester I was heated to 100° C. and stirred under vacuum for 1 hour. The molten mixture (90°-100° C.) was ground in the heated (90° C.) mill which was set in such a manner that the pigment particles were smaller than 20 microns after passing through the grinding mill in the 38 minute period necessary. An additional 374.00 parts of molten Polyester I were added to 114.00 parts of the pigmented polyester and the resulting mixture was stirred at 90° C. until homogeneous.

The pigmented polyester was heated to 100° C. and stirred under vacuum to remove moisture and entrapped gases. To 12.59 parts of 1,6-hexamethylene diisocyanate (50° C.) were added 95.40 parts of the pigmented polyester (80° C.) and the reaction mixture was stirred at 90° C. for 1.5 hours. The isocyanate content of the pigmented prepolymer was 3.01%.

A solution of 1.65 parts Antaron surfactant, 0.06 parts Stabaxol stabilizer, 0.24 parts BHT and 0.08 parts dibutyltin dilaurate in 105.97 parts of "Leichtbenzin" was heated to 68° C. and stirred as in Example 1. The pigmented prepolymer (50.9 parts at 75° C.) was added to the stirred solution over a 20 minute period and the resulting dispersion was stirred at 68° C. for 1 hour. The chain extender (1,4-butanediol, 1.58 parts, 25° C.) was added over a 12 minute period. The dispersion was stirred for an additional 2 hours at 68° C. until no further isocyanate could be detected. The heat source was removed and the dispersion was further stirred until it reached room temperature. The dispersion of the powder was filtered through a Buchner funnel and the solid was washed twice with 200 ml portions of fresh "Leichtbenzin." No pigment was found in the filtrate or wash portions of the "Leichtbenzin." The solid was again filtered and placed in a shallow dish and allowed to dry for three days under vacuum at room temperature. The free flowing pigmented powder was sieved through screens of various mesh sizes and had the physical properties listed in Table 1.

A film of the material was prepared on a smooth glass plate by using a doctor blade to draw down a 1000 micron thick portion of the powder and then allowing the powder particles to fuse together for 30 minutes at 190° C. The film had no surface defects. It was removed from the glass plate and had the physical properties listed in Table 2.

EXAMPLE 3

A grey pigmented (10% pigment) thermoplastic polyurethane-urea powder was prepared in accordance with the present invention.

A mixture of 97.3 parts of Bayferrox 318M pigment, 486.7 parts of Bayertitan R-KB-2 pigment and 584.0 parts of Polyester I was heated to 100° C. and stirred under vacuum for 1 hour. The molten mixture (90°-100° C.) was ground in the mill which was set in such a manner that the pigment particles were smaller than 20 microns after passing through the grinding mill in the 38 minute period necessary. An additional 904.4 parts of molten Polyester I were added to 740.0 parts of the pigmented polyester and the resulting mixture was stirred at 90° C. until homogeneous.

A mixture of 220.0 parts of the pigmented polyester and 203.8 parts of Polyester I was heated to 100° C. and stirred under vacuum for 1 hour to remove moisture and entrapped gases. The mixture was cooled to 70° C. and 57.0 parts of 1,6-hexamethylene diisocyanate were rapidly added to it. The reacting mixture was stirred at 90° C. for 1 hour and an isocyanate content of 2.55% was determined for the grey pigmented prepolymer.

A solution of 12 parts Antaron surfactant, 2 parts BHT, and 0.6 parts Staboxol stabilizer in 933 parts "Leichtbenzin" was heated to 68° C. and stirred for 1 hour as in the previous examples. The grey pigmented prepolymer (373 parts at 70° C.) was added to the stirred solution over a 20 minute time period. The dispersion was stirred for 1 hour and then 28.2 parts of chain extender (Laromin[1] C-260, bis(4-amino-3-methylcyclohexyl) methane, commercially available from BASF A.G.) were added dropwise at 25° C. over a 3 minute period. The dispersion was vigorously stirred (1100 rpm) at 68° C. for an additional 5 minutes and then the stirring speed was reduced to 100 rpm. The dispersion was stirred for an additional hour at 68° C. to ensure that no isocyanate remained. Stirring was maintained as the dispersion was allowed to cool to room temperature. The pigmented powder was filtered, washed and dried as in the previous examples. No pigment or filler remained in the "Leichtbenzin" solution. The free flowing pigmented powder was sieved but the particles had a tendency to loosely agglomerate (i.e., the agglomerated powder could easily be crushed into separate particles) while passing through the screening apparatus; thus, the particle size distribution was not determined. However, 100% of the spherical particles had a diameter of less than 800 microns. The pigmented polyurethane had a melting point of about 174° C., and a softening point of about 130° C.

A film of the material was prepared on a smooth glass plate by using a doctor blade to draw down a 1000 micron thick portion of a 75% slurry of the powder in "Leichtbenzin." The particles were allowed to fuse for 1 hour at room temperature and then 10 minutes at 200° C. The smooth, defect-free film was removed from the glass plate and had the physical properties listed in Table 2.

EXAMPLE 4

A white pigmented polyurethane containing a filler was prepared according to the present invention.

A mixture of Polyester I (393.3 parts), 26.0 parts of Bayertitan R-KB-2 pigment, and 26.0 parts Talkum 15M (talc, commercially available from Bayer AG) was heated to 100° C. and stirred for 1 hour under vacuum to remove water and gases. The mixture was cooled to 70° C. and 58.7 parts of 1,6-hexamethylene diisocyanate were rapidly added to it. The reacting mixture was stirred at 90° C. for 1 hour and an isocyanate content of 2.52% was determined for the white pigmented prepolymer containing filler.

A solution of 12 parts Antaron surfactant, 2 parts BHT, 0.6 parts Stabaxol stabilizer and 2.5 parts dibutyltin dilaurate in 854 parts "Leichtbenzin" was heated to 68° C. and stirred for 1 hour as in Example 1. The white pigmented prepolymer (400 parts at 70° C.) was added to the stirred solution over a 20 minute time period. The dispersion was vigorously stirred for 1 hour and then 10.8 parts of 1,4-butanediol (25° C.) were added over a 10 minute period. The dispersion was stirred at 68° C. for an additional 4.5 hours until no further isocyanate could be detected. Stirring was maintained as the dispersion was allowed to cool to room temperature. The pigmented powder was filtered, washed and dried as in Example 1. No pigment or filler remained in the "Leichtbenzin" solution. The free flowing white pigmented powder containing filler was sieved and had the physical properties listed in Table 1.

The powder formed a smooth, defect free film when a 1000 micron thick portion of the particles was allowed to fuse on a glass plate for 30 minutes at 190° C. The film was removed from the glass plate and had the physical properties listed in Table 2.

EXAMPLE 5

A grey pigmented polyurethane containing greater than 40% pigment was prepared according to the present invention.

A mixture of 97.3 parts of Bayferrox 318M pigment, 486.7 parts of Bayertitan R-KB-2 pigment and 584.0 parts of Polyester I was heated to 100° C. and stirred under vacuum for 1 hour. The molten mixture (90°–100° C.) was ground in the mill which was set in such a manner that the pigment particles were smaller than 20 microns after passing through the grinding mill in the 38 minute period necessary. The pigmented polyester was heated to 100° C. and stirred under vacuum to remove moisture and entrapped gases.

A solution of 21.85 parts of Antaron surfactant, 1.09 parts BHT, 0.43 parts Stabaxol stabilizer and 2.55 parts dibutyltin dilaurate in 890 parts of "Leichtbenzin" was heated to 68° C. and stirred as in Example 1. The pigmented polyester (200.00 parts at 80° C.) was added to the stirred solution over a 30 minute period and the resulting dispersion was stirred vigorously for 0.5 hour at 68° C. Over a 12 minute time period, 14.61 parts of 1,6-hexamethylene diisocyanate were added and the reacting mixture was stirred (1100 rpm) at 68° C. for an additional 1 hour. Over an 8 minute period, 3.91 parts of 1,4-butanediol (25° C.) were added and the dispersion was stirred for an additional 3 hours at 68° C. until no further isocyanate could be detected. The dispersion was further stirred as it was allowed to cool to room temperature. The pigmented powder was filtered, washed and dried as in the previous examples. A small portion of the white pigment (about 5% of the total pigment) could not be filtered from the "Leichtbenzin" solutions. The free flowing pigmented powder was sieved and the physical properties listed in Table 1.

A 1000 micron thick section of the powder was baked for 20 minutes at 230° C. The film had a very poor surface appearance including large voids and small pinholes which were probably a result of poorer flow of the polymer due to the high amount of pigment (about 43 to 46%) in the pigmented powder. The physical properties of the film were not determined.

A 1000 micron thick section of a mixture of 20% of this pigmented powder and 80% of the unpigmented polyurethane of Example 1 was allowed to fuse 30 minutes at 190° C. The film had no surface defects and had the physical properties listed in Table 2.

EXAMPLE 6

A white pigmented polyurethane based on a non-crystalline polyester was prepared according to the present invention.

A mixture of a polyester based on ethylene glycol, phthalic anhydride and adipic acid (molar ratio of acids 51:49) having an OH number of 64 (404.3 parts) and 61.5 parts of Bayertitan R-KB-2 pigment was heated to 100° C. and stirred for 1 hour under vacuum to remove water and gases. The mixture was cooled to 70° C. and 336.5 parts were added over a 5 minute time period to a solution of 12 parts Antaron surfactant, 2 parts BHT, 0.6 parts Stabaxol stabilizer and 12 parts dibutyltin dilaurate in 1037 parts "Leichtbenzin," which had been heated to 68° C. The dispersion was vigorously stirred for 1 hour and then 70.1 parts of 1,6-hexamethylene diisocyanate (25° C.) were added over a 10 minute period. The reacting mixture was stirred at 68° C. for 1 hour and then 22.9 parts of 1,4-butanediol were added. The dispersion was stirred at 68° C. for an additional hour until no further isocyanate could be detected. Stirring was maintained as the dispersion was allowed to cool to room temperature.

The pigmented powder was filtered, washed and dried as in Example 1. No pigment remained in the "Leichtbenzin" solution. The free flowing white pigmented powder was sieved and had the physical properties listed in Table 1.

The powder formed a smooth, defect free film when a 1000 micron thick portion of the particles was allowed to fuse on a glass plate for 30 minutes at 190° C. The film was removed from the glass plate and had the physical properties listed in Table 2.

EXAMPLE 7

A white pigmented polyurethane based on a polyether was prepared according to the present invention.

A mixture of a poly(tetramethylene glycol) polyether having an OH number of 112 (339.6 parts) and 60.0 parts of Bayertitan R-KB-2 pigment was heated to 100° C. and stirred for 1 hour under vacuum to remove water and gases. The mixture was cooled to 70° C. and 296.0 parts were added over a 5 minute time period to a solution of 12 parts Antaron surfactant, 2 parts BHT, 0.6 parts Stabaxol stabilizer and 0.8 parts dibutyltin dilaurate in 1037 parts "Leichtbenzin," which had been heated to 68° C. The dispersion was vigorously stirred for 1 hour and then 84.5 parts of 1,6-hexamethylene diisocyanate (25° C.) were added over a 10 minute period. The reacting mixture was stirred at 68° C. for 0.5 hour and then 22.6 parts of 1,4-butanediol were added. The dispersion was stirred at 68° C. for an additional 4.5 hours until no further isocyanate could be detected. Stirring was maintained as the dispersion was allowed to cool to room temperature.

The pigmented powder was filtered, washed and dried as in the previous examples. No pigment remained in the "Leichtbenzin" solution. The free flowing white pigmented powder was sieved and had the physical properties listed in Table 1.

The powder formed a smooth, defect free film when a 1000 micron thick portion of the particles was allowed to fuse on a glass plate for 30 minutes at 190° C. The film was removed from the glass plate and had the physical properties listed in Table 2.

EXAMPLE 8

A white pigmented polyurethane based on an aromatic diisocyanate and a polyether with an isocyanate to hydroxyl ratio of 0.7 was prepared according to the present invention.

A solution of 12 parts Antaron surfactant, 2 parts BHT, 0.6 parts Stabaxol stabilizer and 8 parts dibutyltin dilaurate in 933.3 parts "Leichtbenzin" was heated to 68° C. The solution was stirred as 136.4 parts of 4,4'-diisocyanato-diphenyl methane (45° C.) were added over a 10 minute period.

A mixture of a poly(tetramethylene glycol) polyether having an OH number of 112 (270 parts) and 30 parts of Bayertitan R-KB-2 pigment was heated to 100° C. and stirred for 1 hour under vacuum to remove water and gases. The mixture was cooled to 70° C. and 212.1 parts were added over a 10 minute time period to the "Leichtbenzin" solution. The dispersion was vigorously stirred for 20 minutes and then 51.5 parts of 1,4-butanediol were added over a 10 minute time period. The reacting mixture was stirred at 68° C. for an additional 2 hours until no further isocyanate could be detected. Stirring was maintained as the dispersion was allowed to cool to room temperature.

The pigmented powder was filtered, washed and dried as in the previous examples. No pigment remained in the "Leichtbenzin" solution. The free flowing white pigmented powder was sieved and had the physical properties listed in Table 1.

The powder formed a smooth, defect free film when a 1000 micron thick portion of the particles were allowed to fuse on a glass plate for 15 minutes at 210° C. The film was removed from the glass plate and had the physical properties listed in Table 2.

TABLE 1

| Physical Property of Powder | Example Number | | | | | | | |
|---|---|---|---|---|---|---|---|---|
| Diameter of spherical particle | 1 | 2 | 3 | 4 | 5 | 6 | 7 | 8 |
| % less than 100 microns | 6 | 11 | — | 2 | 38 | 3 | 7 | 11 |
| % between 100 and 200 microns | 68 | 15 | — | 11 | 40 | 16 | 16 | 34 |
| % between 200 and 315 microns | 5 | 55 | — | 70 | 6 | 40 | 23 | 54 |
| % between 315 and 800 microns | 7 | 17 | — | 14 | 8 | 26 | 48 | 1 |
| % greater than 800 microns | 14 | 2 | 0 | 3 | 8 | 15 | 6 | 0 |
| Melting Point (°C.) | 173 | 160 | 174 | 175 | 165 | 175 | 150 | 180 |
| Softening Point (°C.) | 125 | 125 | 130 | 125 | 115 | 130 | 120 | 130 |

Softening point is the point where the powder particles began to agglomerate and sinter together.

TABLE 2

| | Example Number | | | | | | | |
|---|---|---|---|---|---|---|---|---|
| Film Physical Property | 1 | 2 | 3 | 4 | 5 | 6 | 7 | 8 |
| Tensile strength (MPa) | 18.4 | 18.6 | 16.5 | 18.3 | 15.3 | 7.0 | 7.7 | 7.2 |
| Tensile elongation (%) | 600 | 625 | 480 | 750 | 550 | 370 | 180 | 30 |
| Split tear (N/cm) | 784 | 622 | 785 | 585 | 767 | 380 | 290 | 209 |

TABLE 3

| | Example Number | | | | | | | |
|---|---|---|---|---|---|---|---|---|
| Film Physical Property | 1 | 2 | 3 | 4 | 5 | 6 | 7 | 8 |
| Tensile strength (psi) | 2650 | 2680 | 2370 | 2640 | 2200 | 1000 | 1100 | 1040 |
| Tensile elongation (%) | 600 | 625 | 480 | 750 | 550 | 370 | 180 | 30 |
| Split tear (pli) | 439 | 348 | 440 | 328 | 430 | 210 | 160 | 117 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the direct production of a pigmented thermoplastic polyurethane powder in finely divided form which comprises
   (a) reacting with agitation at an overall equivalent ratio of isocyanate groups to isocyanate reactive groups of about 0.5 to 1.1
      (i) a surfactant-stabilized emulsion of fine droplets of a first reactant which has an average of about two isocyanate or isocyanate reactive groups in admixture with at least one pigment with
      (ii) a second reactant which contain an average of about two isocyanate or isocyanate reactive groups,
      in an inert organic liquid in which said first reactant, said pigment and said powder are substantially insoluble or immiscible to form particles of said powder which are protected from agglomeration by the surfactant, and
   (b) separating the particles of said powder from said inert organic liquid.

2. The process of claim 1 wherein the surfactant comprises a nonionic surfactant.

3. The process of claim 1 wherein the surfactant comprises an olefin/N-vinylpyrrolid(in)one copolymer.

4. The process of claim 1 wherein the surfactant comprises a copolymer containing about 20% by weight N-vinylpyrrolid(in)one and about 80% eicosene-1.

5. The process of claim 3 wherein the inert organic liquid comprises an aliphatic hydrocarbon liquid having a boiling range of about 65° C. to 200° C.

6. A process for the direct production of a pigmented thermoplastic polyurethane powder in finely divided form which comprises
   (a) reacting with agitation at an overall equivalent ratio of isocyanate groups to hydroxyl groups of about 0.5 to 1.1
      (i) a surfactant-stabilized emulsion of fine droplets of a first reactant which has an average of about two hydroxyl groups in admixture with at least one pigment with
      (ii) a second reactant which contains an average of about two isocyanate groups,
      in an inert organic liquid in which said first reactant, said pigment and said powder are substantially insoluble or immiscible to form particles of said powder which are protected from agglomeration by the surfactant, and
   (b) separating the particles of said powder from said inert organic liquid.

7. The process of claim 6 wherein said first reactant is a polyester diol having a molecular weight of 400 to about 6,000.

8. The process of claim 6 wherein said first reactant is a mixture of one or more diols having molecular weights of less than 400 with one or more polyester diols having molecular weights of 400 to about 6000.

9. The process of claim 8 wherein said one or more diols comprise 1,4-butanediol and/or 1,6-hexanediol and said one or more polyester diols are prepared from reactants comprising adipic acid and 1,4-butanediol and/or 1,6-hexanediol.

10. A process for the direct production of a pigmented thermoplastic polyurethane powder in finely divided form which comprises
    (a) reacting with agitation at an overall equivalent ratio of isocyanate groups to hydroxyl groups of about 0.5 to 1.1
       (i) a surfactant-stabilized emulsion of fine droplets of a first reactant comprising a urethane prepolymer which has an average of about two isocyanate groups in admixture with at least one pigment with
       (ii) a second reactant which contains an average of about two hydroxyl groups,
       in an inert organic liquid in which said first reactant, said pigment and said powder are substantially insoluble or immiscible to form particles of said powder which are protected from agglomeration by the surfactant, and
    (b) separating the particles of said powder from said inert organic liquid.

11. The process of claim 10 wherein said prepolymer is prepared from 1,6-hexamethylene diisocyanate and a polyester diol having a molecular weight of 400 to about 6000 and prepared from adipic acid and 1,6-hexanediol.

12. The process of claim 10 wherein said second reactant comprises 1,4-butanediol and/or 1,6-hexanediol.

13. A process for the direct production of a pigmented thermoplastic polyurethane powder in finely divided form which comprises
    (a) reacting with agitation at an overall equivalent ratio of isocyanate groups to amino groups of about 0.5 to 1.1
       (i) a surfactant-stabilized emulsion of fine droplets of a first reactant comprising a urethane prepolymer which has an average of about two isocyanate groups in admixture with at least one pigment with
       (ii) a second reactant which contains an average of about two two primary or secondary amino groups,
       in an inert organic liquid in which said first reactant, said pigment and said powder are substantially insoluble or immiscible to form particles of said powder which are protected from agglomeration by the surfactant, and
    (b) separating the particles of said powder from said inert organic liquid.

14. A pigmented thermoplastic polyurethane powder in finely divided form which is prepared by a process which comprises
    (a) reacting with agitation at an overall equivalent ratio of isocyanate groups to isocyanate reactive groups of about 0.5 to 1.1
       (i) a surfactant-stabilized emulsion of fine droplets of a first reactant which has an average of about two isocyanate or isocyanate reactive groups in admixture with at least one pigment with
       (ii) a second reactant which contain an average of about two isocyanate or isocyanate reactive groups,
       in an inert organic liquid in which said first reactant, said pigment and said powder are substantially insoluble or immiscible to form particles of said powder which are protected from agglomeration by the surfactant, and
    (b) separating the particles of said powder from said inert organic liquid.

15. The powder of claim 14 wherein the surfactant comprises a nonionic surfactant.

16. The powder of claim 14 wherein the surfactant comprises an olefin/N-vinylpyrrolid(in)one copolymer.

17. The powder of claim 14 wherein the surfactant comprises a copolymer containing about 20% by weight N-vinylpyrrolid(in)one and about 80% eicosene-1.

18. The powder of claim 16 wherein the inert organic liquid comprises an aliphatic hydrocarbon liquid having a boiling range of about 65° C. to 200° C.

19. A pigmented thermoplastic polyurethane powder in finely divided form which is prepared by a process which comprises
   (a) reacting with agitation at an overall equivalent ratio of isocyanate groups to hydroxyl groups of about 0.5 to 1.1
      (i) a surfactant-stabilized emulsion of fine droplets of a first reactant which has an average of about two hydroxyl groups in admixture with at least one pigment with
      (ii) a second reactant which contains an average of about two isocyanate groups,
      in an inert organic liquid in which said first reactant, said pigment and said powder are substantially insoluble or immiscible to form particles of said powder which are protected from agglomeration by the surfactant, and
   (b) separating the particles of said powder from said inert organic liquid.

20. The powder of claim 19 wherein said first reactant is a polyester diol having a molecular weight of 400 to about 6000.

21. The powder of claim 19 wherein said first reactant is a mixture of one or more diols having molecular weights of less than 400 with one or more polyester diols having molecular weights of 400 to about 6000.

22. The powder of claim 21 wherein said one or more diols comprise 1,4-butanediol and/or 1,6-hexanediol and said one or more polyester diols are prepared from reactants comprising adipic acid and 1,4-butanediol and/or 1,6-hexanediol.

23. A pigmented thermoplastic polyurethane powder in finely divided form which is prepared by a process which comprises
   (a) reacting with agitation at an overall equivalent ratio of isocyanate groups to hydroxyl groups of about 0.5 to 1.1
      (i) a surfactant-stabilized emulsion of fine droplets of a first reactant comprising a urethane prepolymer which has an average of about two isocyanate groups in admixture with at least one pigment with
      (ii) a second reactant which contains an average of about two hydroxyl groups,
      in an inert organic liquid in which said first reactant, said pigment and said powder are substantially insoluble or immiscible to form particles of said powder which are protected from agglomeration by the surfactant, and
   (b) separating the particles of said powder from said inert organic liquid.

24. The powder of claim 23 wherein said prepolymer is prepared from 1,6-hexamethylene diisocyanate and a polyester diol having a molecular weight of 400 to about 6000 and prepared from adipic acid and 1,6-hexanediol.

25. The powder of claim 23 wherein said second reactant comprises 1,4-butanediol and/or 1,6-hexanediol.

26. A pigmented thermoplastic polyurethane powder in finely divided form which is prepared by a process which comprises
   (a) reacting with agitation at an overall equivalent ratio of isocyanate groups to amino groups of about 0.5 to 1.1
      (i) a surfactant-stabilized emulsion of fine droplets of a first reactant comprising a urethane prepolymer which has an average of about two isocyanate groups in admixture with at least one pigment with
      (ii) a second reactant which contains an average of about two two primary or secondary amino groups,
      in an inert organic liquid in which said first reactant, said pigment and said powder are substantially insoluble or immiscible to form particles of said powder which are protected from agglomeration by the surfactant, and
   (b) separating the particles of said powder from said inert organic liquid.

* * * * *